(12) United States Patent
Williams

(10) Patent No.: US 7,077,070 B1
(45) Date of Patent: Jul. 18, 2006

(54) HIGH CLEARANCE FERTILIZER APPLICATION SYSTEM

(75) Inventor: James R. Williams, Clarion, IA (US)

(73) Assignee: Hagie Manufacturing, Clarion, IA (US)

( * ) Notice: Subject to any disclaimer, the term of this patent is extended or adjusted under 35 U.S.C. 154(b) by 737 days.

(21) Appl. No.: 10/219,123

(22) Filed: Aug. 15, 2002

(51) Int. Cl.
*A01C 23/00* (2006.01)

(52) U.S. Cl. .................................................. 111/121

(58) Field of Classification Search ............... 111/118, 111/120, 121, 122, 127, 129, 923, 924, 925
See application file for complete search history.

(56) References Cited

U.S. PATENT DOCUMENTS

| | | | | |
|---|---|---|---|---|
| 2,619,361 A | * | 11/1952 | Connors et al. ....... | 280/93.505 |
| 2,822,216 A | * | 2/1958 | Finnley et al. ................. | 47/1.7 |
| 3,964,565 A | * | 6/1976 | Cagle et al. ................. | 180/340 |
| 4,062,305 A | * | 12/1977 | Stoker ......................... | 111/149 |
| 4,090,456 A | * | 5/1978 | Morrison et al. ........... | 111/111 |
| 4,100,862 A | * | 7/1978 | Mowen et al. ................. | 111/14 |
| 4,244,522 A | * | 1/1981 | Hartwig ..................... | 239/148 |
| 4,266,489 A | * | 5/1981 | Parramore .................. | 111/200 |
| 4,583,319 A | * | 4/1986 | Wolff et al. .................... | 47/1.7 |

\* cited by examiner

*Primary Examiner*—Victor Batson
(74) *Attorney, Agent, or Firm*—Brett Trout

(57) ABSTRACT

An application system for applying nitrogen to the soil. The system is a tool bar provided with a plurality of long arms, coupled to disks. Coupled behind the disks is a nitrogen dispensing system, coupled to a large fluid tank on a vehicle. By utilizing a high clearance vehicle, the system is utilized to apply nitrogen supplements to the soil throughout the growing season.

20 Claims, 5 Drawing Sheets

HIGH CLEARANCE FERTILIZER APPLICATION SYSTEM

BACKGROUND OF THE INVENTION

1. Field of the Invention

The present invention relates to a system for applying fertilizer to row crops and, more particularly, to a system for applying fertilizer to row crops throughout the growing season, without irreparably damaging the crops.

2. Description of the Prior Art

Row crop nitrogen application systems are known in the art. Such systems typically involve a tractor pulling a tool bar. The tool bar is provided with a plurality of disks to cut several slits in the soil. A small trailer, provided with a gas tight tank, trails behind the tool bar and is provided with hosing to direct anhydrous ammonia from within the tank to the tool bar, and then to knives traveling behind the disks. In this manner, anhydrous ammonia is directed into the slits below the surface of the soil to increase the nitrogen content thereof. Application of nitrogen in this manner greatly increases the yield of grasses, such as corn. Although grasses continue to obtain benefit from subsequent nitrogen application, tractors and tool bars typically have clearances too low to apply nitrogen to the soil after the plants have started to grow. Application after the plants have started to emerge from the soil would lead not only to the wide track of the tractor crushing and destroying plants, but would also lead to the low clearance of the tool bar snapping off and killing young plants.

Although it is known in the art to provide high clearance applicators to spray pesticides on growing crops, the high clearance of such applicators typically limits their ability to apply fertilizer directly to the soil. It would, therefore, be desirable to provide a system for applying fertilizer to growing plants. The prior art difficulties described hereinabove are substantially eliminated by the present invention.

SUMMARY OF THE INVENTION

In an advantage provided by this invention, a system is provided for applying nitrogen to the soil in a field of growing crops.

Advantageously, this invention provides a nitrogen application system which is inexpensive and easy to maintain.

Advantageously, this invention provides a system for applying nitrogen to the soil with little undesired soil compaction.

Advantageously, this invention provides a system for distributing nitrogen directly to the soil without substantial damage to row crops one meter or more in height.

In an embodiment of this invention, a system is provided for applying fluid to soil, comprising a first arm and second arm coupled to a frame. The frame and arms define an area sufficient to accommodate the passage of a plant of at least approximately 1 meter in height. The arms are provided with soil disrupters, such as disks, and are also provided with means, such as knives, for dispensing fluid into the disrupted soil. In the preferred embodiment, the system is capable of passing over plants 1.5 meters or more in height, and is provided with its own storage tank to supply nitrogen to the knives.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
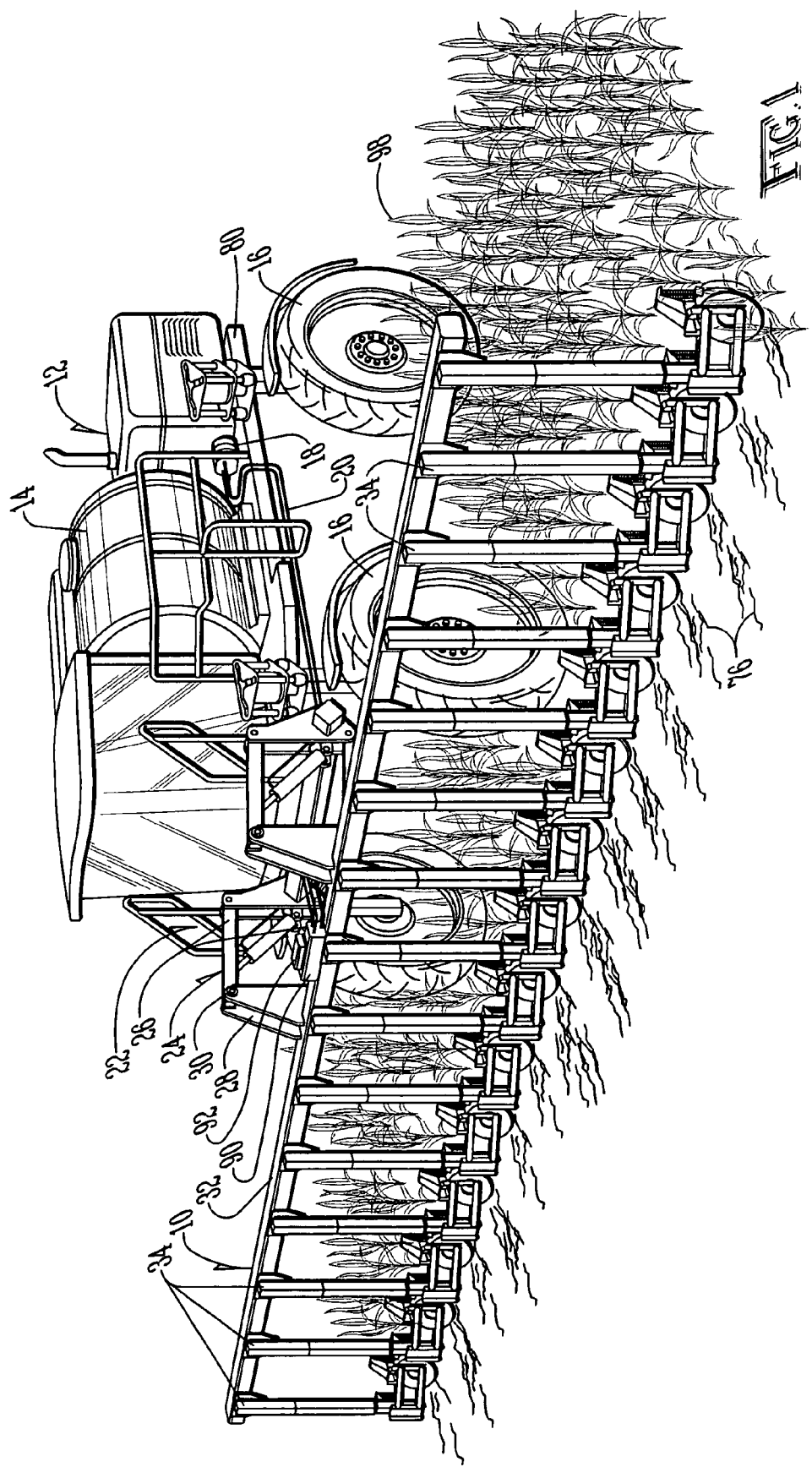
FIG. 1 illustrates a perspective view of the fluid application system and vehicle.

With reference to the drawings, a fluid application system is shown generally as (10) in FIG. 1. Coupled to the fluid application system (10) is a vehicle (12). While the vehicle (12) may be of any type known in the art, in the preferred embodiment the vehicle (12) is STS 12 Sprayer, manufactured by Hagie Manufacturing Company, Clarion, Iowa. The vehicle (12) is preferably provided with a 1200 gallon capacity fluid tank. The vehicle (12) is also preferably provided with 320 90R50, 380 85R46 or 580 70R38 tires, depending on row width and soil conditions. Preferably, the vehicle (12) is provided with a clearance equal to at least about 1 meter. In the preferred embodiment, the vehicle is provided with a clearance of at least approximately 1.8 meters.

Figure 2:
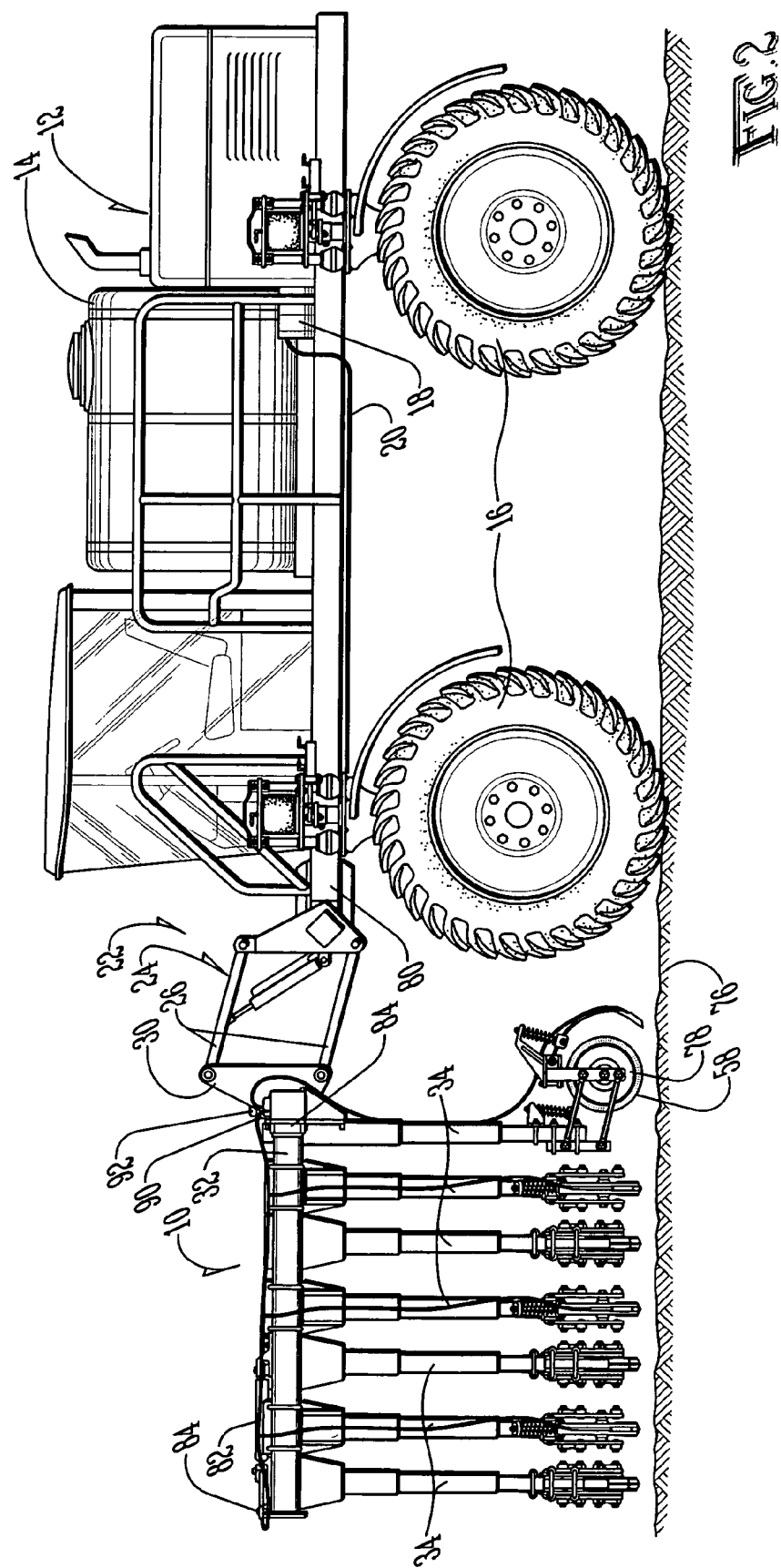
FIG. 2 illustrates a side elevation of the fluid application system and vehicle of FIG. 1.
Figure 3:
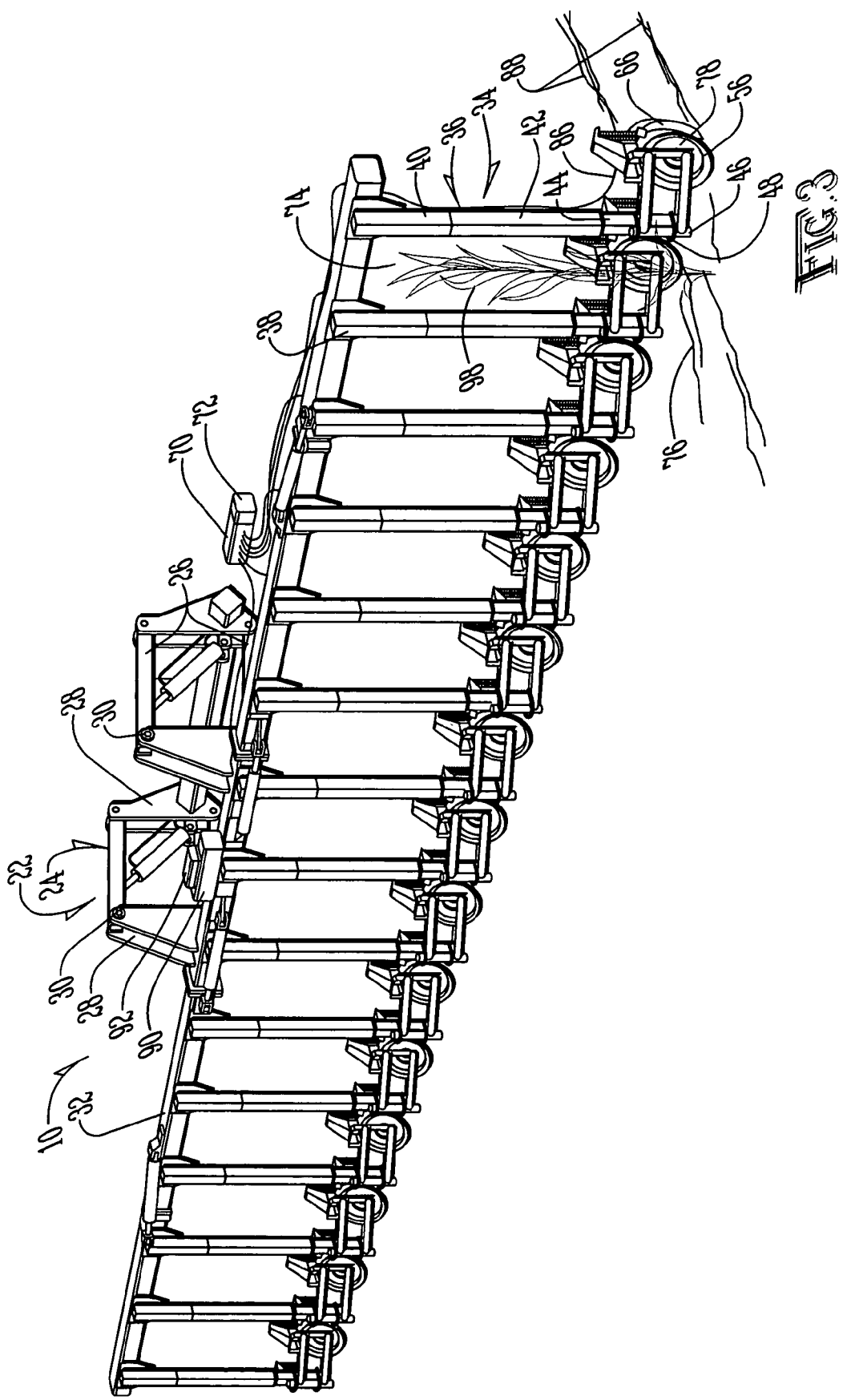
FIG. 3 illustrates a rear elevation of one side of the fluid application system of the present invention.
Figure 4:
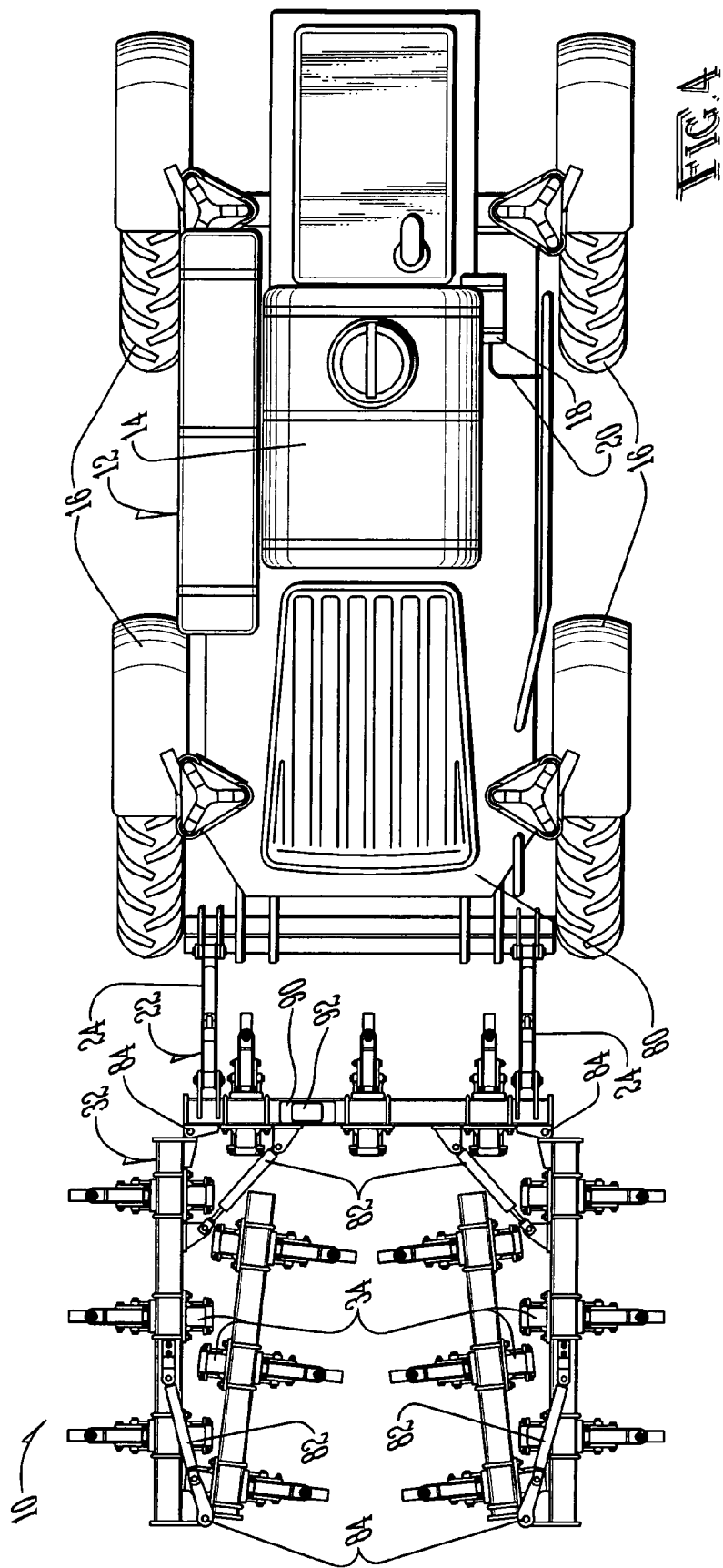
FIG. 4 illustrates a top plan view of the fluid application system and vehicle of FIG. 1, shown with the fluid application system folded for transport.

The vehicle (12) is also provided with a hydraulic motor (18), coupled, in a manner such as that well known in the art, to a plurality of hydraulic lines (20). Provided on the vehicle (12) is a hydraulically actuated boom (22), coupled by hydraulic lines (20) to the hydraulic motor (18). The boom (22) includes a four bar parallel linkage (24), such as those known in the art, to maintain the two connection bars (26) parallel to the two mounting bars (28), as the connection bars (26) are raised and lowered. The fluid application system (10) is coupled to the connection bars (26) by releasable connection means, such as bolts (30) or the like. As shown in FIG. 2, the fluid application system (10) comprises a mounting bar (32). The mounting bar (32) includes five separate bars hinged to one another and hydraulically actuated to extend as shown in FIG. 3, or to retract, as shown in FIG. 4, for transport. In the preferred embodiment, the mounting bar (32) extends from a transport position 3.7 meters wide to a working position 11.4 meters wide.

As shown in FIG. 3, coupled to the mounting bar (32) are a plurality of legs (34) secured to the mounting bar (32) by weldments or similar securement means. As the construction of the legs (34) is substantially similar, the description will be limited to a single leg (36). (FIG. 3). As shown in FIG. 3, the leg (36) is a metal tube 10 centimeters wide by 10 centimeters wide, and having a thickness of 0.455 centimeters. Of course, it will be obvious to those of ordinary skill in the art that legs of any suitable construction or dimensions may be utilized. Coupled to the bottom section (44) of the leg (38) is a stainless steel tube (46). The tube (46) is preferably 3.8 centimeters in diameter and is journaled to the bottom section (44) by U-bolts (48), or similar connection means.

Figure 5:
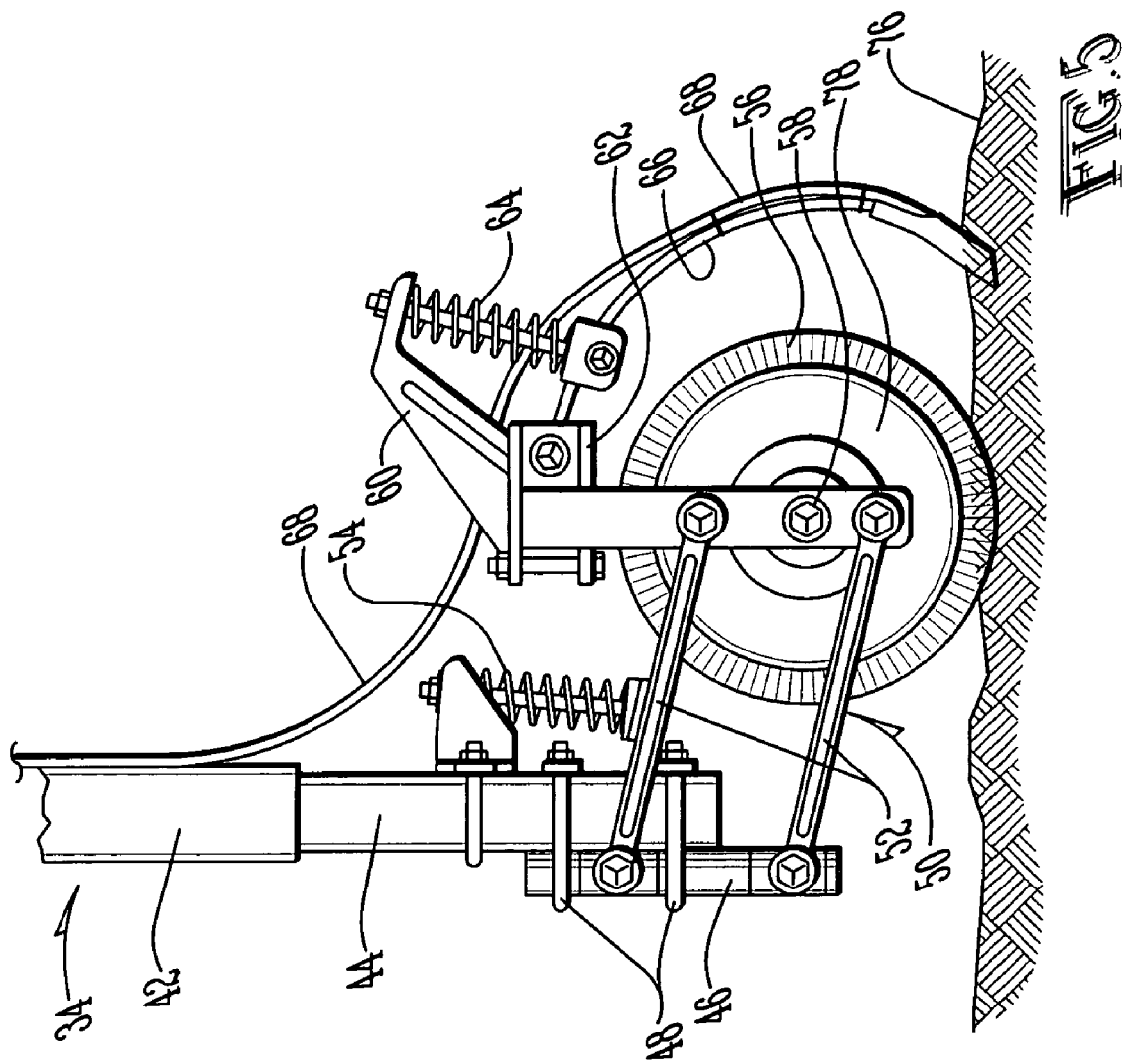
FIG. 5 illustrates a side elevation of the injection assembly of the present invention.

As shown in FIG. 5, coupled to the tube (46) is part of a pivot assembly (50). The pivot assembly (50) includes a pivot arm (52), pivotally connected to the tube (46) by a bracket or similar securement means. The pivot arm (52) is coupled by a rigidly attached ear (54) to a shaft (56). The shaft (56) extends into a spring (58), which is also welded or otherwise secured to the tube (46). The pivot arm (52) is journaled to a disk (59), such as those well known in the art. In operation, the resilience of the spring (58) maintains the disk (59) at a predetermined orientation. If the disk (59) encounters a rock (not shown) or other obstruction, the obstruction forces the disk (59) to pivot upward, thereby pivoting the pivot arm (52) and extending the shaft (56), thereby compressing the spring (58). Once the obstruction has passed, the resilience of the spring (58) again forces the shaft (56) toward the spring (58), thereby returning the disk (59) to its predetermined orientation.

Also coupled to the pivot arm (52) is a tail bar (60). Coupled to the end of the tail bar (60) is a support plate (62), preferably constructed of stainless steel. Secured to the support plate (62) is a spring (64) which, in turn, is coupled to a steel bar (66) in a manner which biases the steel bar (66) toward a predetermined orientation. The spring (64) allows the steel bar (66) to divert from this parallel position to traverse rocks, cement, stumps or similar obstacles, without permanently bending or damaging the steel bar (66) or its orientation relative to the tube (46).

Also as shown in FIG. 5, coupled to the lower portion of the steel bar (66) is a nitrogen delivery tube (68). The nitrogen delivery tube (68) may be constructed of any suitable material known in the art, and preferably has a 1.9 centimeter diameter with a wall thickness of 0.32 centimeters. The nitrogen delivery tube (68) is also secured to the support plate (62) to prevent the nitrogen delivery tube (68) from becoming inadvertently dislodged from the steel bar (66). The nitrogen delivery tube (68) is preferably in fluid communication with the fluid tank (14). Preferably provided between the fluid tank (14) and nitrogen delivery tube (68) is a pump (70) and valve (72), electronically controlled from inside the cab (74) of the vehicle (12).

As shown in FIG. 3, the first leg (36), mounting bar (32), and second leg (38), define an interior (74), having a first dimension between the soil (76) and mounting bar (32) of between 1 and 2.5 meters, preferably between 1.5 and 2.1 meters, and most preferably 1.8 meters. The legs (34) are preferably provided a width ranging from 0.5 to 1 meter. The legs are preferably fixed relative to one another, approximately 0.76 meters apart, but may be releasably mounted to the mounting bar (32) to allow for infinite adjustment or variation, depending on the width of the crop rows. Although the height of the interior space (74) will obviously fluctuate, depending upon the condition of the soil (76), in the preferred embodiment, the disks (56) are provided with float wheels (78) to maintain the disk (56) cutting a predetermined depth which, in the preferred embodiment, is 10 centimeters. The float wheels (78) are preferably injection molded plastic, secured to the disks (56) by bolts or similar securement means. The wheels (78) preferably have a diameter of 40 centimeters to maintain the disks (56) cutting the soil 10 centimeters deep.

When it is desired to operate the fluid application system of the present invention, the vehicle (12) is driven to the fluid application system (10), which preferably rests on a stand (80). An operator (not shown) actuates the hydraulic motor (18) to lower the boom (22) so that the connection bar (26) is adjacent the mounting bar (32). The operator then bolts the mounting bar (32) to the connection bar (26) using a quick release or other attachment system, such as those known in the art, and raises the fluid application system (10) sufficiently to prevent damage to the disks (56) as the fluid application system (10) is transported.

As shown in FIG. 4, if it is desired to transport the fluid application system (10), the operator (not shown) actuates the hydraulic motor (18) to actuate hydraulic pistons (82) provided on the mounting bar (32). The hydraulic pistons (82) retract the sections of the mounting bar (32) so as to cause them to pivot around a plurality of hinges (84) provided on the mounting bar (32). The hydraulic pistons (82) continue to retract the mounting bar (32) until the fluid application system (10) takes on the general configuration depicted in FIG. 4, having a width of 3.7 meters. As many locals have ordinances prohibiting vehicles wider than 3.7 meters from traveling on roadways without special permission, the retraction of the fluid application system (10) to a width of 3.7 meters is particularly desirable when the fluid application system (10) is to be transported on public roadways. Once the vehicle (12) has transported the fluid application system (10) to the desired location for application, the operator actuates the hydraulic motor (18) to extend the hydraulic pistons (82) and straighten the mounting bar (32) to the position shown in FIG. 3. Once the mounting bar (32) has been straightened, the hydraulic motor (18) is actuated to lower the fluid application system (10) to the predetermined height, so that the disks (56) penetrate the soil to the level of the float wheel (78). The operator then actuates the vehicle (12) to move forward. The operator simultaneously activates the pump (70) and valve (72) to distribute fertilizer, such as liquid nitrogen (86) into the soil through the nitrogen delivery tubes (68) into the troughs (88) cut by the disks (56). Although the fluid application system (10) is preferably designed to dispense liquid nitrogen (86), it should, of course, be noted that the system (10) may be used to distribute any herbicide, pesticide, fertilizer, or any other desired fluid, in either gas or liquid form.

As shown in FIG. 3, provided on the mounting bar (32) are a hydraulic control box (90) and electronic control system (92). Providing the hydraulic control box (90) for the fluid application system (10) and the electric control system (92) directly on the fluid application system (10), and coupling the hydraulic control box (90) and electronic control (92) to the vehicle (12), allows all of the connections between the fluid application system (10) and vehicle (12) to be made directly to the hydraulic control box (90), thereby expediting the attachment to and detachment from the system (10).

As shown in FIG. 3, as the vehicle (12) drives the fluid application system (10) across the soil (76), the disks (56) cut the soil while the float wheels (78) prevent the disks (56) from cutting the soil (76) too deeply. Once the soil (76) has been cut, the steel bars (66) locate the nitrogen delivery tubes (68) within the resulting troughs (88), and delivers the predetermined amount of liquid nitrogen (86) into the troughs. The journaled connection of the tube (46) to the bottom section (44) of the first leg (36) allows the disk (56) to rotate relative to the vehicle (12), as the vehicle (12) turns during application. This rotational movement of the disks (56), combined with the spring mounted steel bar (66) and four bar parallel linkage system (50), allows the disks (56) and nitrogen delivery tube (68) to raise, lower and rotate independent of the remainder of the fluid application system (10). This independence reduces breakage and maintenance associated with the disks (56) hitting rocks or other obstructions in the soil (76), or being twisted off as the vehicle (12) turns. Although in the preferred embodiment the fluid application system (10) is provided with fifteen legs, any desired number of legs, in any desired dimension or spacing may be provided. It is also anticipated that the legs may be designed for manual or hydraulic positioning, both vertically and laterally, to accommodate plants in rows of varying dimensions and height. While it is preferable to maintain the height of the mounting bar (32) above the top of any plant (98), in some plants, such as corn, once a height of approximately 2 meters has been reached, the mounting bar (32) can contact the plant (98) at this height and bend the plant without significant permanent damage.

Once the appropriate amount of nitrogen (86) has been applied to the soil (76), the hydraulic motor (18) is actuated to raise the boom (22) and fluid application system (10), and actuate the hydraulic pistons (82) to collapse the fluid application system (10) as shown in FIG. 4, so that the fluid application system (10) may be transported along roadways.

Although the invention has been described with respect to a preferred embodiment thereof, it is to be understood that is not to be so limited, since changes and modifications can be made therein which are within the full intended scope of this invention as defined by the appended claims. For example, it is anticipated that the fluid application system (10) may be constructed of any desired material, of any suitable dimensions or spacing, sufficient to accommodate a particular crop. It is additionally anticipated that the fluid application system (10) may be hydraulically, pneumatically or mechanically actuated, and that the fluid application system (10) may be permanently fixed in position relative to the vehicle (12). It is also anticipated that the mounting bar (32) may be provided in seven sections having sixteen legs (34).

What is claimed is:

1. A system for applying fluid below a surface of soil comprising:
    (a) a frame;
    (b) a first arm coupled to said frame;
    (c) a second arm coupled to said frame;
    (d) wherein said first arm, said second arm and said frame define an area sufficient to accommodate the passage of a plant at least approximately 1 meter in height;
    (e) first means coupled to said first arm for creating a first area of disrupted soil;
    (f) first means for dispensing a fluid below a surface of said first area of disrupted soil;
    (g) second means coupled to said second arm for creating a second area of disrupted soil; and
    (h) second means for dispensing said fluid below a surface of said second area of disrupted soil.

2. The system of claim 1, wherein said first arm, said second arm and said frame define an area sufficient to accommodate the passage of a plant at least approximately 1.5 meters in height.

3. The system of claim 1, further comprising a fluid tank coupled to said first means for dispensing.

4. The system of claim 3, further comprising means for pumping said fluid from said fluid tank to said first means for dispensing.

5. The system of claim 1, further comprising a vehicle comprising:
    (a) a frame;
    (b) a front wheel coupled to said frame;
    (c) a rear wheel coupled to said frame;
    (d) means for driving at least one wheel selected from the group consisting of said front wheel and said rear wheel.

6. The system of claim 5, wherein said vehicle is provided with a clearance of at least approximately 1 meter.

7. The system of claim 5, wherein said vehicle is provided with a clearance of at least approximately 1.5 meters.

8. The system of claim 7, wherein said first arm, said second arm and said frame define an area sufficient to accommodate the passage of a plant at least approximately 1.5 meters in height.

9. The system of claim 5, wherein said front wheel and said rear wheel are each less than approximately 0.75 meters wide.

10. The system of claim 9, wherein said front wheel and said rear wheel are each at least approximately 1 meter in diameter.

11. The system of claim 5, wherein said front wheel and said rear wheel are each less than approximately 0.5 meters wide.

12. The system of claim 11, wherein said front wheel and said rear wheel are each at least approximately 1 meter in diameter.

13. The system of claim 1, wherein said first means for creating a first area of disrupted soil is a disk.

14. The system of claim 13, further comprising means for preventing said disk from substantially penetrating soil more than a predetermined distance.

15. The system of claim 14, wherein said preventing means is a wheel coupled to said disk.

16. A system for applying fluid below a surface of soil comprising:
    (a) a tool bar;
    (b) a plurality of arms depending from said tool bar in a manner which defines a plurality of passages of sufficient area to accommodate the passage of row crops at least approximately 1 meter in height;
    (c) means coupled to said plurality of arms for disrupting the soil;
    (d) means coupled to said plurality of arms for dispensing a fluid below the surface of the soil; and
    (e) a fluid tank coupled to said dispensing means.

17. The system of claim 16, having a plurality of arms depending from said tool bar in a manner which defines a plurality of passages of sufficient area to accommodate the passage of row crops at least approximately 1.5 meters in height.

18. The system of claim 16, further comprising a vehicle comprising:
    (a) a frame;
    (b) a front wheel coupled to said frame;
    (c) a rear wheel coupled to said frame;
    (d) means for driving at least one wheel selected from the group consisting of said front wheel and said rear wheel.

19. The system of claim 16, wherein said plurality of arms comprises at least about eight arms.

20. A system for applying fluid below a surface of soil comprising:
    (a) a vehicle having at least about 1 meter clearance;
    (b) a tool bar coupled to said vehicle;
    (c) a plurality of arms depending from said tool bar in a manner which defines a plurality of passages of sufficient area to accommodate the passage of row crops at least approximately 1 meter in height;
    (d) means coupled to said plurality of arms for disrupting the soil;
    (e) means coupled to said plurality of arms for dispensing a fluid below the surface of the soil;
    (f) a fluid tank coupled to said dispensing means; and
    (g) means coupled to said tool bar for adjusting a height of said tool bar relative to said vehicle.

* * * * *